(12) United States Patent
Mayerböck

(10) Patent No.: US 6,290,218 B1
(45) Date of Patent: Sep. 18, 2001

(54) SPRING-STRUT SUPPORTING BEARING

(75) Inventor: Wilhelm Mayerböck, Bad Neuenahr (DE)

(73) Assignee: Mannesmann Boge GmbH, Bonn (DE)

( * ) Notice: Subject to any disclaimer, the term of this patent is extended or adjusted under 35 U.S.C. 154(b) by 0 days.

(21) Appl. No.: 09/434,241

(22) Filed: Nov. 5, 1999

(30) Foreign Application Priority Data

Nov. 5, 1998 (DE) .............................................. 198 50 971
Sep. 1, 1999 (DE) .............................................. 199 41 558

(51) Int. Cl.$^7$ .................................................. B60G 13/00
(52) U.S. Cl. ............. 267/220; 188/321.11; 280/124.147; 280/124.155
(58) Field of Search ..................................... 267/195, 220, 267/64.11, 64.15, 35, 219; 188/321.11, 322.16; 280/124.147, 124.146, 124.145, 124.155

(56) References Cited

U.S. PATENT DOCUMENTS

| | | | |
|---|---|---|---|
| 4,474,363 | * 10/1984 | Numazawa et al. | .................... 267/34 |
| 4,773,635 | * 9/1988 | Buma | ..................................... 267/220 |
| 5,000,429 | * 3/1991 | Wittmar et al. | ....................... 267/220 |
| 5,165,669 | * 11/1992 | Mayerbock et al. | ............. 267/140.12 |
| 5,454,585 | * 10/1995 | Dronen et al. | ......................... 267/220 |

FOREIGN PATENT DOCUMENTS

| | | | |
|---|---|---|---|
| 3619942 | * 12/1987 | (DE) | ..................................... 267/220 |
| 4024696 | * 7/1991 | (DE) | ..................................... 267/220 |

* cited by examiner

Primary Examiner—Robert J Oberleitner
Assistant Examiner—Pamela J. Rodriguez
(74) Attorney, Agent, or Firm—Cohen, Pontani, Lieberman & Pavane

(57) ABSTRACT

A spring-strut supporting bearing has at least one rubber bearing and a first fastening part for connecting it to the vehicle body. A second fastening part fixes a piston-cylinder assembly in position relative to the at least one rubber bearing and the first fastening part, the first fastening part being fixedly connected to the vehicle body via a securing ring.

8 Claims, 4 Drawing Sheets

SPRING-STRUT SUPPORTING BEARING

BACKGROUND OF THE INVENTION

1. Field of the Invention

The invention relates to a spring-strut supporting bearing having at least one rubber bearing and at least one fastening part for connecting to a vehicle body and having a further fastening part for fixing a piston-cylinder assembly in position relative to the vehicle body.

2. Description of the Related Art

Prior art springspring-strut strut supporting bearings are disclosed, for example, in German references DE 40 15 524 C1 and DE 40 24 696 C1 in which the actual fastening of the spring-strut supporting bearing together with a piston-cylinder assembly to the body of a vehicle has not been described. Spring-strut supporting bearings of this type are conventionally bolted to the vehicle body or to a so-called spur on the vehicle body. However, during assembly of vehicle bolted connections such as the connection of the prior art spring-strut support bearing require corresponding manual machining.

SUMMARY OF THE INVENTION

The object of the invention is to provide a module including a spring-strut supporting bearing and a piston-cylinder assembly of the spring strut, that can be automatically fitted and fastened into a body of a vehicle.

To achieve this object, a fastening part is fixedly connected to the vehicle body via a securing ring. An advantage of the invention is that a securing ring is placed between the vehicle body and the fastening part to obtain a form-fitting fastening instead of a bolted connection. The securing rings are automatically supplied to a manufacturing assembly line more conveniently than bolts and are easily machined with the assistance of industrial robots.

According to a further embodiment of the invention, the fastening part comprises a groove for accommodating the securing ring. In this case, it is of particular advantage that securing rings are easily placed into a groove in the fastening part.

An embodiment which is convenient in terms of manufacturing engineering includes a thin-walled element to be designed in the cross-sectional shape of a U as the groove. It is of advantage here that the thin-walled element may also comprise a component of the actual spring-strut supporting bearing. In this connection, the outer part, on whose inner part the rubber bearing is pressed-in or vulcanized directly or via corresponding reinforcing rings, can preferably be correspondingly deformed.

A further embodiment provides for the vehicle body to have a drilled hole through which the fastening part is insertable. The securing ring being arranged between the edge region of the drilled hole and the fastening part.

To facilitate an installation which is simple in terms of manufacture, the securing ring is divided transversely to the circumferential direction. In this case, the securing ring is advantageously divided into two parts of differing size, so that the larger part snaps securely on the fastening part and then merely has to be connected to the corresponding smaller part.

According to a further refinement, the securing ring is produced from plastic.

According to an essential feature, the fastening part increases in diameter, starting from that side of the drilled hole of the vehicle body which is opposite the securing ring. In this connection, the increasing contour of the fastening part is arranged so that the entire module as it is being automatically loaded into the vehicle body can at the same time be centered with respect to the drilled hole in the vehicle body.

If the module includes the spring-strut supporting bearing, the piston-cylinder unit and an additional helical spring, the increase in diameter of the fastening part continues until the outer circumference of the fastening part reaches the diameter of a spring plate of a helical spring arranged coaxially to the piston-cylinder assembly. In this connection, the spring plate of the helical spring may advantageously be pressed directly to the fastening part of the spring-strut supporting bearing to obtain a ready-fitted constructional unit.

According to another refinement, the securing ring has a step-shaped shoulder for centering it in the body.

The securing ring can, moreover, advantageously include a leading-in slope.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like references denote similar elements throughout the several views:

FIG. 1a is a partial longitudinal sectional view of a module according to an embodiment of the present invention including a spring-strut supporting bearing, a piston-cylinder assembly, a heal spring and part of the vehicle body;

FIG. 1b is a partial longitudinal sectional view of another embodiment of the module of FIG. 1a;

FIG. 3b is a detailed view showing a connection of the two parts of the securing ring of FIG. 3a.

DETAILED DESCRIPTION OF THE PRESENTLY PREFERRED EMBODIMENTS

Figures 1A, 1B:
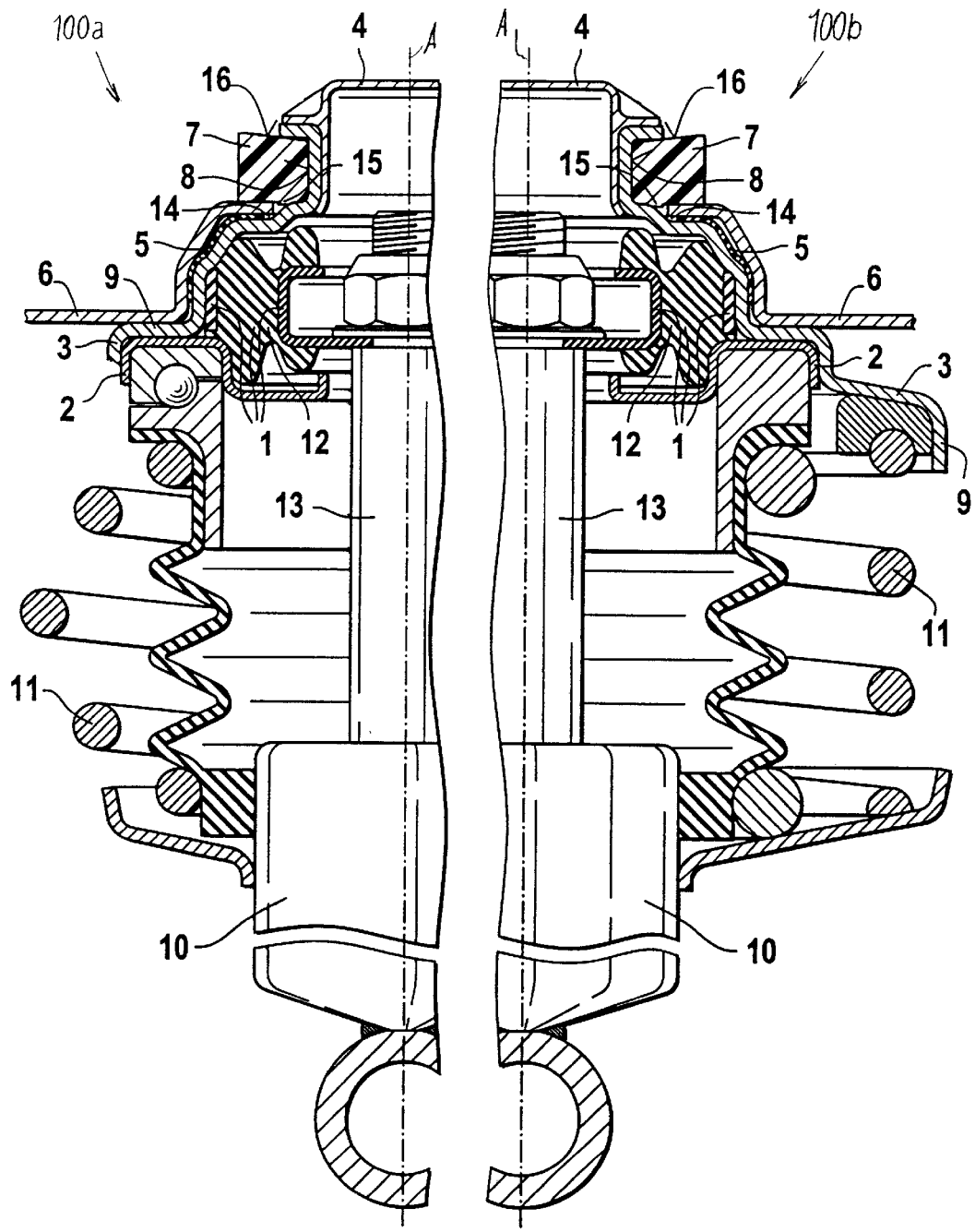

A module 100a according to an embodiment of the present invention is shown in FIG. 1 includes a piston-cylinder assembly 10 connected with a helical spring 11 and a spring-strut supporting bearing 12. The spring-strut supporting bearing 12 includes a spring plate 9 on which the helical spring 11 is likewise supported. The module 100a may be preassembled as a integral unit. The preassembled module 100a is connected to a vehicle body 6 of a vehicle via a securing ring 7. For this purpose, the securing ring 7 is placed in a corresponding groove 8 of the fastening part 3 between the vehicle body 6 and a first fastening part 3. The groove 8 of the first fastening part 3 and the securing ring 7 may be machined automatically in a series of manufacturing procedures.

In the embodiment of FIG. 1a, the spring plate 9 of module 100a indirectly supports the helical spring 11. FIG. 1b shows another embodiment of a module 100b in which the spring plate 9 and the first fastening part 3 extend radially outward to directly support the helical spring 11.

Figure 2:
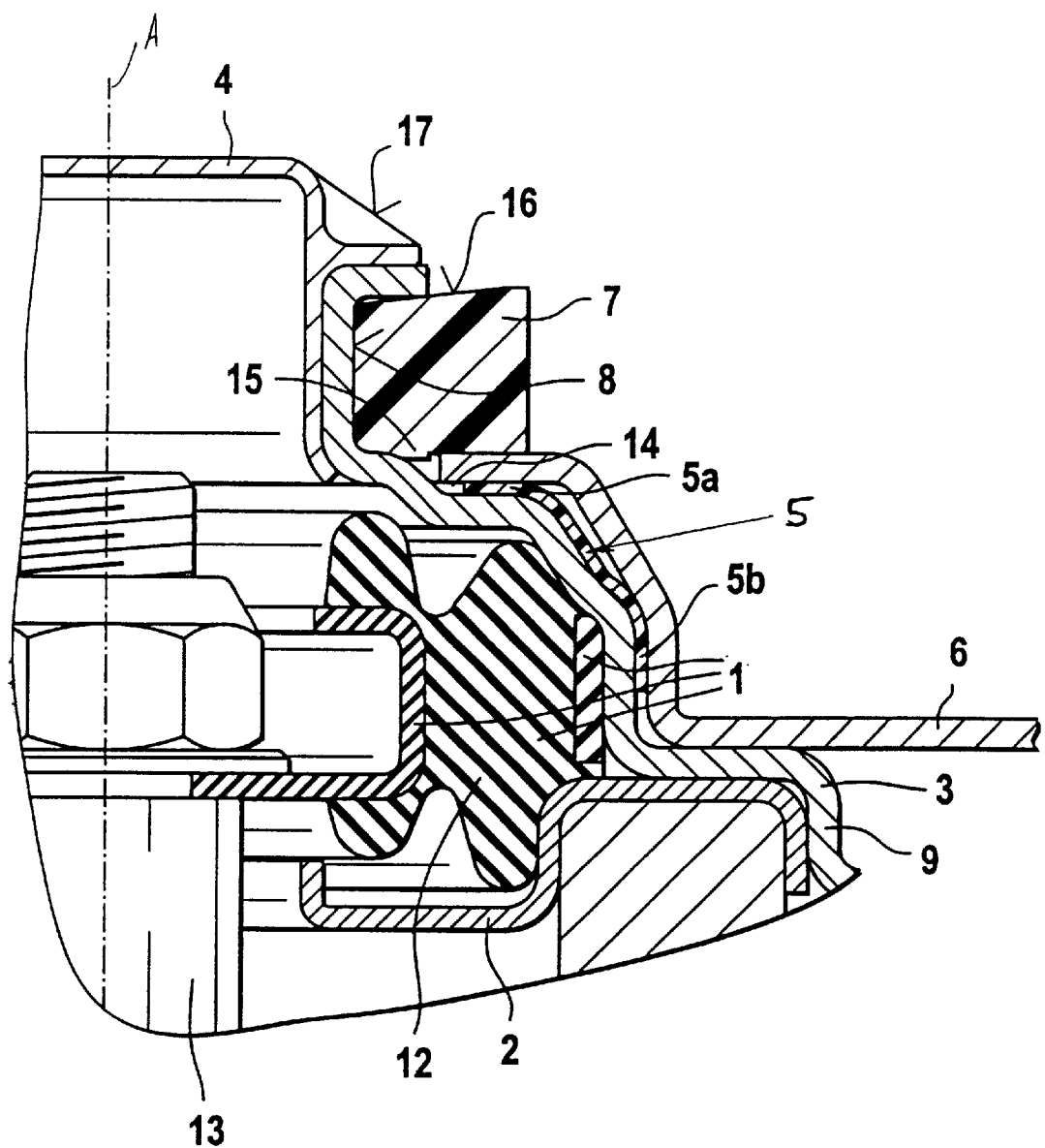
FIG. 2 is a more detailed view of the fastening of the spring-strut supporting bearing via the securing ring in the vehicle body according to the module in FIG. 1b.

Referring now to FIGS. 1a, 1b and 2, the actual fastening to the vehicle body 6 is shown as a detail in FIG. 2 in which a rubber bearing 1 arranged between a piston rod 13 of the piston cylinder assembly 10 and the first fastening part 3. A second fastening part 2 is used to fix the piston-cylinder assembly 10 relative to the rubber bearing 1 and the first fastening part 3. The helical spring 11, which is arranged coaxially around the piston-cylinder assembly 10, is supported in the spring plate 9 which may be fixedly connected to the first fastening part 3 via a suitable connection, for example, a press connection.

The upper region of the first fastening part 3 includes a groove 8 with an external diameter that is smaller than a diameter of a drilled hole 14 in the vehicle body 6. Accordingly, during assembly the groove 8 is arranged so that it protrudes through the drilled hole 14. In this position, the securing ring 7 is snapped between the edge region of the drilled hole 14 of the vehicle body 6 and the groove 8 of the first fastening part 3.

Figure 3A:
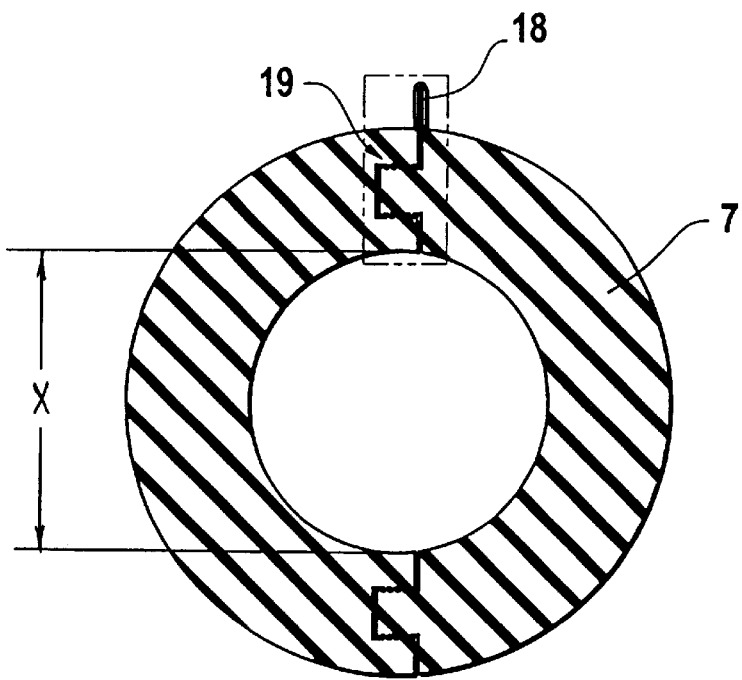
FIG. 3a is an end view of a securing ring according to an embodiment of the present invention.
Figure 3B:
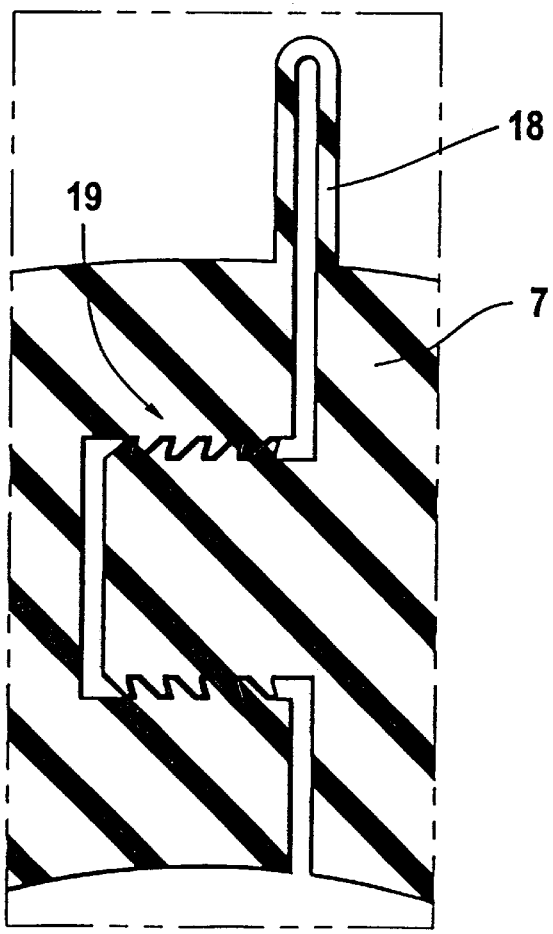

Referring now to FIGS. 3a and 3b, the securing ring 7 is divided into two parts and designed such that the separation is not provided centrally. Therefore the larger part snaps in at the diameter X and is fixed to the smaller part, for example by pressing. The two parts of the securing ring 7 are designed such that a captive pairing is ensured. The captive pairing may be effected, for example, by a fir-tree profile 19 as shown in FIG. 3b.

Referring back to FIGS. 1a, 1b and 2, the securing ring 7 may be provided with a shoulder 15 as an additional securing means which apart from the captive securing 19 also performs a further centering of the securing ring 7 in the drilled hole 14 of the vehicle body 6.

The securing ring 7 may also be adapted to the first fastening part 3 via a leading-in slope 16.

A seal 5 is provided between the vehicle body 6 and the fastening part 3. The seal 5 comprises a first region 5a and a second region 5b (see FIG. 2) arranged so that in the first region 5a, which extends substantially radially with respect to a longitudinal axis A of the module, the metal tolerances of the fastening part 3 and of the vehicle body 6 are compensated for and are sealed off from contamination. The second region 5b, which extends axially relative to the longitudinal axis A, is formed so that tolerances of the metal parts are compensated for and radial slipping of the module is eliminated. The second region 5b also facilitates centering of the first fastening part 3 relative to the drilled hole 14. Furthermore, the seal 5 may be designed such that the first fastening part 3 and the vehicle body 6 do not have any metallic contact and the seal 5 (elastomer) thereby serves as an insulating element.

This design according to the invention ensures a central fastening which is free of play and renders orientation-free, automatic installation possible.

A protective cap 4 may be fitted on the first fastening part 3 such that the upper region of the securing ring 7 having the leading-in slope 16 is sheared off and removed after installation to reduce the overall height.

FIGS. 3a and 3b show, as an individual part, the securing ring 7 which is held on one side via a film hinge 18 and is secured via the fir-tree profile 19.

Figure 4:
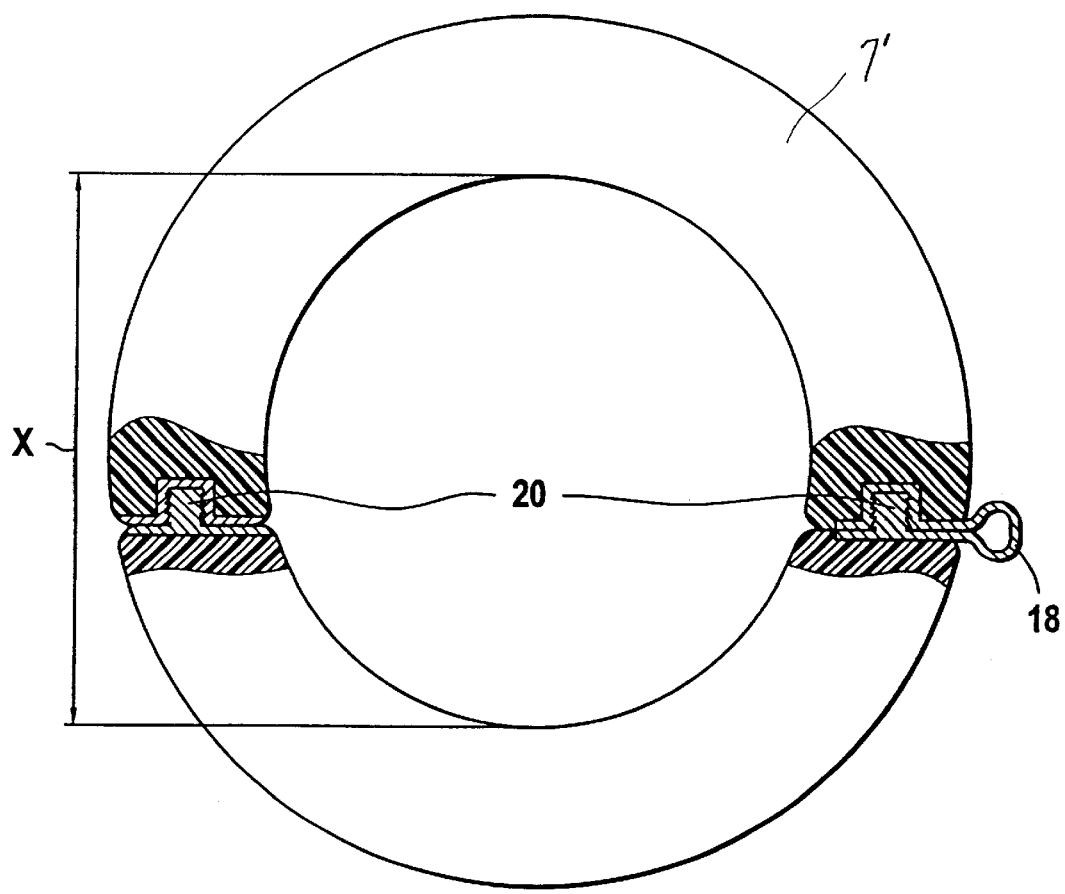
FIG. 4 is an end view of another embodiment of a securing ring according to the present invention.

FIG. 4 shows another embodiment of a securing ring 7' in which a latching means 20 is separately provided as the securing means.

The invention is not limited by the embodiments described above which are presented as examples only but can be modified in various ways within the scope of protection defined by the appended patent claims.

I claim:

1. A spring-strut supporting bearing for a spring strut including a piston cylinder assembly having a helical spring and a spring plate for holding the helical spring, said spring-strut support bearing mountable in a drilled hole in a vehicle body and comprising:

a first fastening part connectable to the vehicle body;

at least one rubber bearing arrangeable between said piston-cylinder assembly and said first fastening part;

a second fastening part for fixing the piston-cylinder assembly in position with said at least one rubber bearing and said first fastening part; and a securing ring, arrangeable on said first fastening part for fixedly connecting said first fastening part to the vehicle body, wherein said first fastening part comprises a groove for accommodating said securing ring and said first fastening part comprises a thin-walled element having a U-shaped cross section, wherein said groove comprises said U-shaped cross section.

2. The spring-strut supporting bearing of claim 1, wherein said first fastening part is insertable in the drilled hole in the vehicle body, said securing ring arrangable between an edge region of the drilled hole and said first fastening part.

3. A spring-strut supporting bearing for a spring strut including a piston cylinder assembly having a helical spring and a spring plate for holding the helical spring, said spring-strut support bearing mountable in a drilled hole in a vehicle body and comprising:

a first fastening part connectable to the vehicle body;

at least one rubber bearing arrangeable between said piston-cylinder assembly and said first fastening part;

a second fastening part for fixing the piston-cylinder assembly in position with said at least one rubber bearing and said first fastening part; and a securing ring arrangeable on said first fastening part for fixedly connecting said first fastening part to the vehicle body, wherein said securing ring comprises two parts divided transversely to a circumferential direction of said securing ring.

4. The spring-strut supporting bearing of claim 3, wherein a first of said two parts comprises a first size and a second of said two parts comprises a second size, and said first size is different from said second size.

5. The spring-strut supporting bearing of claim 3, wherein said securing ring comprises plastic.

6. A spring-strut supporting bearing for a spring strut including a piston cylinder assembly having a helical spring and a spring plate for holding the helical spring, said spring-stut support bearing mountable in a drilled hole in a vehicle body and comprising:

a first fastening part connectable to the vehicle body;

at least one rubber bearing arrangeable between said piston-cylinder assembly and said first fastening part;

a second fastening part for fixing the piston-cylinder assembly in position with said at least one rubber bearing and said first fastening part; and a securing ring arrangeable on said first fastening part for fixedly connecting said first fastening part to the vehicle body, wherein said first fastening part increases in diameter on a side of the drilled hole which opposes the side on which said securing ring is mountable up to a diameter sufficient to form the spring plate of the helical spring arranged coaxially to the piston-cylinder assembly.

7. A spring-strut supporting bearing for a spring strut including a piston cylinder assembly having a helical spring and a spring plate for holding the helical spring, said spring-strut support bearing mountable in a drilled hole in a vehicle body and comprising:

a first fastening part connectable to the vehicle body;

at least one rubber bearing arrangeable between said piston-cylinder assembly and said first fastening part;

a second fastening part lor fixing the piston-cylinder assembly in position with said at least one rubber bearing and said first fastening part; and a securing ring arrangeable on said first fastening part for fixedly connecting said first fastening part to the vehicle body, wherein said securing ring comprises a step-shaped shoulder for centering said securing ring in the vehicle body.

8. A spring-strut supporting bearing for a spring strut including a piston cylinder assembly having a helical spring and a spring plate for holding the helical spring, said spring-strut support bearing mountable in a drilled hole in a vehicle body and comprising:

a first fastening part connectable to the vehicle body;

at least one rubber bearing arrangeable between said piston-cylinder assembly and said first fastening part;

a second fastening part for fixing the piston-cylinder assembly in position with said at least one rubber bearing and said first fastening part; and a securing ring arrangeable on said first fastening part for fixedly connecting said first fastening part to the vehicle body, wherein said securing ring comprises a leading-in slope.

* * * * *